United States Patent [19]

Namiki

[11] Patent Number: 4,466,132
[45] Date of Patent: Aug. 14, 1984

[54] CROSS-POLARIZATION CROSSTALK ELIMINATION CIRCUIT

[75] Inventor: Junji Namiki, Tokyo, Japan

[73] Assignee: Nippon Electric Co., Ltd.

[21] Appl. No.: 365,143

[22] Filed: Apr. 5, 1982

[30] Foreign Application Priority Data

Apr. 15, 1981 [JP] Japan ............................... 56-55529
Apr. 15, 1981 [JP] Japan ............................... 56-55530

[51] Int. Cl.³ .......................................... H04B 1/12
[52] U.S. Cl. .................................. 455/295; 343/362; 455/60; 455/63
[58] Field of Search ............ 455/60, 63, 65, 295, 455/296, 303, 304, 305, 306; 343/100 PE; 370/6; 333/21 A

[56] References Cited

U.S. PATENT DOCUMENTS

| | | | |
|---|---|---|---|
| 3,646,448 | 2/1972 | Harmon, Jr. et al. | 455/60 |
| 4,146,893 | 3/1979 | Inagaki et al. | 455/63 |
| 4,220,923 | 9/1980 | Pelchat et al. | 455/295 |
| 4,283,795 | 8/1981 | Steinberger | 455/303 |

FOREIGN PATENT DOCUMENTS

129815  10/1979  Japan ................................... 455/60

OTHER PUBLICATIONS

"New Automatic Polarization Cancelling Control for Multiple Station Satellite Communication Systems", International Conf. on Communications, Toronto, Canada, Jun. 4-7, 1978, IEEE Catalog No. 78CH1350-8 CSCB, vol. 3.

Primary Examiner—Marc E. Bookbinder
Attorney, Agent, or Firm—Laff, Whitesel, Conte & Saret

[57] ABSTRACT

A digital transmission system is provided based on a cross-polarization band-sharing technique using a conventional antenna system which does not have a sufficient cross-polarization discrimination.

An interference elimination circuit receives two mutually orthogonal cross-polarized waves and restores to at least one of the received cross-polarized signals, a baseband signal which is free of cross-polarization interference attributable to orthogonal cross-polarization crosstalk components. This circuit includes an orthogonal cross-polarization, crosstalk component adder having a weighting circuit for multiplying an interference component of the received orthogonal cross-polarized signals by a compensation coefficient. A compensating adder adds the output of the weighting circuit to a desired one of the received cross-polarized signals. An error detector detects the difference between a transmitted signal and the desired one of said received signals on the basis of the output of said cross-polarization crosstalk component adder. An oscillator generates cyclic infinitesimal signals which a correlator uses for detecting any correlation between the output of the oscillator and the output of the error detector. An integrator integrates the output of said correlator. A control unit adds the output of the integrator to the output of the oscillator and supplies the resulting sum as the compensation coefficient for the weighting circuit of the orthogonal cross-polarization component adder.

1 Claim, 9 Drawing Figures

CROSS-POLARIZATION CROSSTALK ELIMINATION CIRCUIT

The present invention relates to a circuit for cancelling cross-polarization interference which occurs in high-frequency digital transmission over a microwave relay link or the like and, more particularly, to a cross-polarization crosstalk elimination circuit for use in a receiver of such a communication system.

Microwave communication systems have made rapid progress, not only in terrestrial but also in satellite communications. The need for radio communication is also expected to expand greatly into a mobile communication service. Hence, there is an increasing need for the so-called reuse of currently utilized frequency bands, in addition to the exploitation of the quasi-millimeter wave bands. Already, the recommendation of the International Radio Consultative Committee (CCIR) concerning the frequency channel allocation for 4 to 6 GHz frequency-modulated (FM) transmission has expressly called for the use of the cross-polarization technique. In the field of satellite communication, too, the International Telecommunications Satellite Organization (INTELSAT) is likely to adopt in its INTELSAT V series of satellites cross-polarization techniques (instead of a single polarization technique) to share one allocated frequency in the 4 to 6 GHz band.

To achieve such a cross-polarization, band-sharing technique, it is necessary to cancel cross-polarization interference. This form of interference may occur when raindrops transfer energy from one polarized signal to another polarized signal sharing the same frequency. Thus, it is necessary to compensate for signal deterioration caused by rainfall polarization of a propagation wave. An improvement is also desirable in the polarization characteristics of antennas and power feed systems.

Free space enables independent, simultaneous transmission of two cross-polarized waves through two independent paths. However, rainfall causes anisotropy in each transmission path. Therefore, cross-coupling causes an unfavorable interference between the cross-polarized waves (i.e., depolarization), if a cross-polarization band-sharing system is used.

A cross-polarization crosstalk cancelling technique is to automatically compensate for such cross-coupling by using a cancellation circuit in an antenna feed system or a receiver.

Analog transmission (mainly by FM transmission) has been used in microwave band communication. Practical systems have been designed for cancelling cross-polarization interference by restoring orthogonal relationships. In the intermediate frequency (IF) band, a variable phase shifter and an attenuator either are coupled around an antenna feed system or are arranged to eliminate cross-polarization interference between individually cross-polarized waves, by means of an interference-cancelling circuit. For details of the latter type of a cancelling system, reference is made to an IEEE paper by Lin-shan Lee, entitled NEW AUTOMATIC POLARIZATION CANCELLING CONTROL FOR MULTIPLE-STATION SATELLITE COMMUNICATION SYSTEMS, International Communications Conference Record, 1978, pp. 43.3.1–43.3.5. However, the Lee system is intended for analog transmission and requires the insertion of a special pilot signal for the elimination of cross-polarization interference. As a result, the Lee system cannot properly eliminate interference between cross-polarized waves.

The recent trend toward digital transmission, even in the microwave region, has greatly enhanced the need for a more efficient technique for the cancellation of cross-polarization interference, which may be based on the characteristics of the digital transmission.

One object of the present invention, therefore, is to provide a cross-polarization crosstalk elimination circuit free from the above-described disadvantages.

At present, highly accurate cross-polarization discrimination cannot be expected, since the beam width of a communication satellite antenna currently in use is considerably greater than the width of a terrestrial microwave channel. The increased beam width is used because global beam antennas use assymetrical beams to increase their effective radiation power, and because Faraday rotation occurs in outer space.

According to one aspect of the invention, a digital transmission is based on a cross-polarization band-sharing technique by using a conventional antenna system which does not have a sufficient cross-polarization discrimination.

An interference elimination circuit of the invention is adapted to receiver two mutually orthogonal cross-polarized waves and to derive from at least one of the received cross-polarized signals, a baseband signal which is free of cross-polarization interference attributable to orthogonal cross-polarization crosstalk components.

An orthogonal cross-polarization crosstalk component adder has a weighting circuit for multiplying an interference component of the received orthogonal cross-polarized signals by a compensation coefficient. A compensating adder adds the output of the weighting circuit to a desired one of the received cross-polarized signals. An error detector detects the difference between a transmitted signal and the desired one of the received signals, on the basis of the output of the cross-polarization crosstalk component adder. An oscillator generates cyclic infinitesimal signals. A correlator detects any correlation between the output of the oscillator and the output of the error detector. An integrator integrates the output of the correlator and a control unit adds the output of the integrator to the output of the oscillator to supply the sum as the compensation coefficient for the weighting circuit of the orthogonal cross-polarization component adder.

BRIEF DESCRIPTION OF THE FIGURES

The advantages and features of the invention will become more apparent by the following detailed description, taken in conjunction with the accompanying drawings, wherein:

In the drawings, like reference numerals denote like structural elements.

FIG. 1A shows the arrangement of radio channel frequencies shared by mutually orthogonal cross-polarized waves. More specifically, the power spectra of radio channels of horizontally polarized waves (referred to as "HR-polarized waves") are represented by reference numerals 1000, 1001, and 1002, while those of radio channels of vertically polarized waves ("VT-polarized waves") by reference numerals 1003, 1004, and 1005.

FIG. 1B shows the reception spectra of the HR-polarized waves where it is supported to be possible to ideally discriminate the orthogonal cross-polarized waves on the receiving side. In this case, the spectra 1003, 1004, and 1005 on the vertical side of the cross-polarized waves are completely suppressed and are not received.

Actually, the spectra on the vertical side of the cross-polarized waves are also received because of the cross-polarization interference that takes place as described above.

Figure 1A:
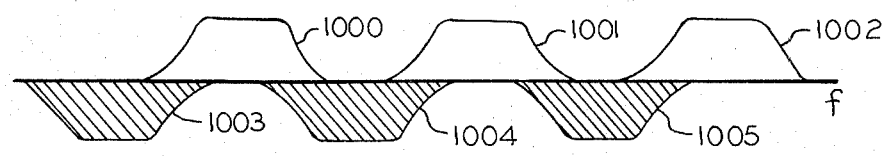
FIGS. 1A to 1E are diagrams for describing orthogonal cross-polarization interference.
Figure 1B:
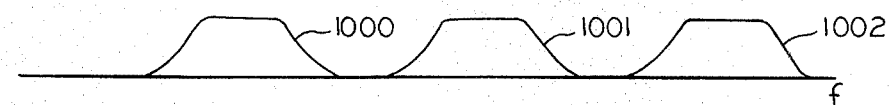
Figure 1C:
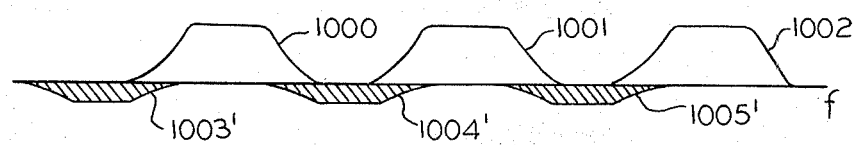

FIG. 1C illustrates the reception spectra of HR-polarized waves in such a situation, where interference components (i.e., spectra 1003', 1004', and 1005', are also received) although only in small amplitudes.

Figure 1D:
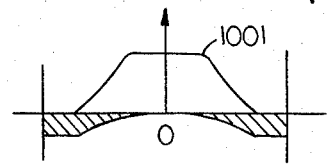

Now suppose the spectrum of a signal desired to be received and demodulated is indicated by reference numeral 1001 in FIG. 1C. This spectrum is frequency-separated in the ordinary radio frequency band, to be converted into an intermediate frequency and further detected to become a baseband signal as shown in FIG. 1D.

The present invention is intended to provide a circuit for eliminating cross-polarization interference on the basis of such a baseband signal.

Figure 2:
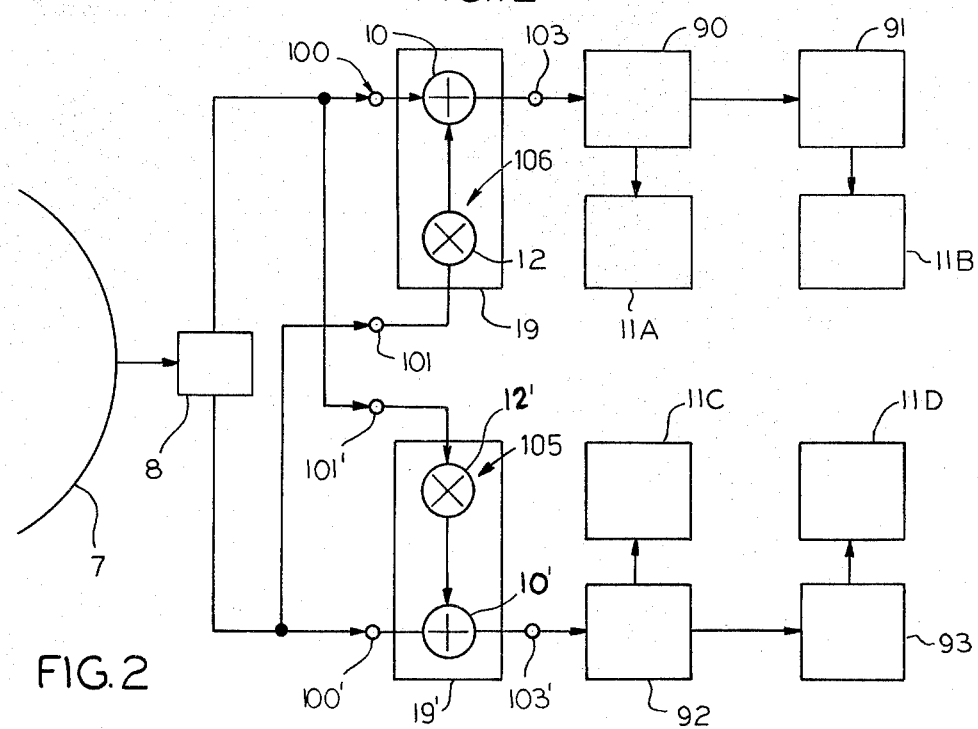
FIG. 2 is a block diagram of a conventional receiver for digitally transmitted signals utilizing orthogonal cross-polarized waves.

FIG. 2 shows a conventional microwave receiver for digital transmission over many microwave frequency channels by utilizing orthogonal cross-polarized waves. An orthomode transducer 8 separates the orthogonal cross-polarized signals received by an antenna 7 into two polarized signals. Channel separators 90, 91, 92, and 93 frequency-separate various radio channel components contained in these two polarized signals. Coherent detectors 11A, 11B, 11C, and 11D are respectively connected to the channel separators 90, 91, 92, and 93 for demodulating data, corresponding to pertinent channels, out of the channel components. Blocks 19 and 19' are devices for eliminating orthogonal cross-polarization interference. The block 19 is connected to any one of the separators 90 and 91, while the block 19' is connected to any one of the separators 92 and 93.

The block 19 comprises input terminals 100 and 101, a weighting circuit 12 for multiplying the interference signal by a complex coefficient and a compensating adder 10 whose output is the sum of a signal appearing at the terminal 100 and the product of the multiplication of a signal at the terminal 101 by a constant complex coefficient $\eta$. The adder 10 eliminates cross-polarization interference. If spectra, such as those shown in FIG. 1C, are fed to the terminal 100, the terminal 101, conversely, receives the reception spectra of VT-polarized waves, like those illustrated in FIG. 1E.

Figure 1E:
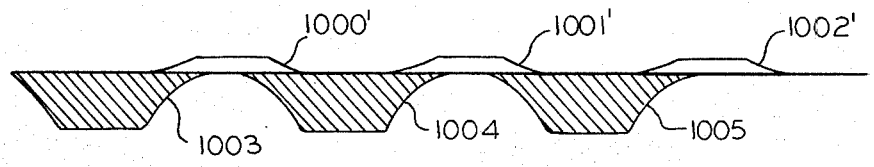

Undesired spectra 1003', 1004', and 1005' which, as is evident from FIGS. 1C and 1E, are similar to the spectra 1003, 1004, and 1005, can be cancelled by multiplying the spectra of FIG. 1E by the complex coefficient $\eta$. Likewise, undesired spectra 1000', 1001', and 1002' contained in FIG. 1E can be cancelled by multiplying the spectra 1000, 1001, and 1002 by another suitable complex coefficient $\eta$. This cancellation is achieved by the block 19'. Whereas, weighting circuits 12 and 12' in the blocks 19 and 19', respectively, are controlled by two demodulated signals from said detectors 11A or 11B and 11C or 11D, respectively. This will be described in detail below with reference to FIG. 3.

Figure 3:
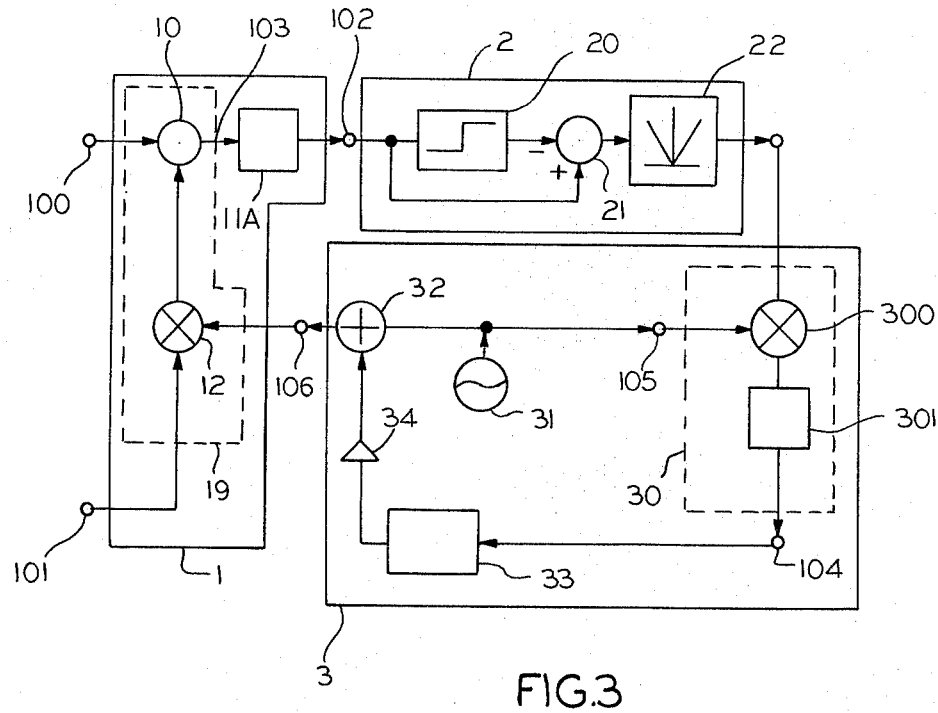
FIGS. 3 to 5 are block diagrams for illustrating first to third embodiments of the invention.

Referring to FIG. 3, one embodiment of the invention has an orthogonal cross-polarization crosstalk component adder 1, an error detector 2, and a control unit 3. In the drawing, a block 19 represents the same unit that is represented by 19 in FIG. 2. It is assumed now that the block 19 shown in FIG. 3 is connected to the channel separator 90 shown in FIG. 2, although the separator 90 is omitted from FIG. 3 for simplicity of the drawing. Besides, other means such as 91 and 11B, having no direct bearing on the invention, are omitted from FIG. 3. The determination of the suitable complex coefficients $\eta$ and $\eta'$ is achieved by the unit 3. A detector 11A, for deriving a baseband signal from the output of an adder 10, consists of a coherent detector or the like.

A signal discriminator 20 of the error detector 2 is a circuit for estimating and restoring a symbol sent from the transmitter. A subtractor 21 supplies, as its output, the difference between the output from and the input to said discriminator 20. In other words, the subtractor 21 extracts, to give as its output, an error attributable to an external disturbing component superimposed on the originally transmitted symbol. An absolute value circuit 22 supplies the absolute value of said error as its output to the control unit 3.

The unit 3 is composed of an oscillator 31 for generating an infinitesimal signal of any frequency. A suitable complex coefficient can be supplied, responsive to the output of said detector 2, to a weighting circuit 12 of the adder 1 and for giving a perturbation to the output of an integrator 33. A correlator 30 establishes a correlation between the output of the oscillator 31 and the output of said detector 2. The integrator 33 integrates the output values of the correlator 30. An inverter 34 inverts the output of the integrator 33. An adder 32 gives the sum of the output of the inverter 34 and the output of the oscillator 31 to the circuit 12.

The correlator 30 comprises a multiplier for multiplying the output of the error detector 2 by the output of the oscillator 31, and a low-pass filter 301.

Next will be described the operation of this (FIG. 3) embodiment which eliminates cross-polarization interference. The structure of FIG. 3 is connected with that of FIG. 2 through the terminals 103 and 106. To the input terminal 100 is fed a HR-polarized component Hk from the orthomode transducer 8 (shown in FIG. 2) and to the input terminal 101, is fed a VT-polarized component Vk. The component Hk is a signal resulting from the sum of the original HR-polarized component H and a cross-polarization interference signal $\delta V$ from the original polarized component V. The component Vk is similarly composed. Thus, $$Hk = H + \delta V$$

$$Vk = V + \delta H$$

Assuming that a weighting coefficient given to the weighting circuit 12 of the adder 1 is $\eta$, at the output terminal 102 of the detector 11A emerges a signal He resulting from the sum of the component Hk and the product of the multiplication of the VT-polarized component by the weighting coefficient $\eta$ to cancel the interference. Thus, $$He = Hk + \eta Vk \approx H + \delta V + \eta V$$

$$= H + (\delta + \eta)V$$

Now assume that $H \gg |(\delta+\eta)V|$ and suppose that an estimated signal $\hat{H}$ (which is the transmitted signal restored from He by the discriminator 20) is equal to the original HR-polarized component H, (i.e., $\hat{H}=H$). An error signal E can be defined in the following relationship:

$$|E| = |He - H| = |\delta + \eta| \cdot |V|$$

The value of the above equation will be equal to 0 if $\eta = -\delta$, but actually, it slightly deviates from the optimal value (i.e., at $-\delta$). This deviation is represented by a parameter $\eta d$, and has the following relationship:

$$\eta = -\delta \pm \eta d$$

Meanwhile, assuming that the infinitesimal output of the oscillator 31 is $\eta_0 \sin \omega_0 t$, the output of the adder 32 (i.e., the coefficient $\eta$ to be given to the weighting circuit 12) is:

$$\eta = -\delta \pm \eta_0 \sin \omega_0 t.$$

and, accordingly, $$|E| = |\pm \eta d + \eta_0 \sin \omega_0 t| \cdot |V|$$

Now is $\eta_0$, which is extremely small, is used within the range of $$\eta d \gg \eta_0 \pm \eta d + \eta_0 \sin \omega_0 t = \pm (\eta d \pm \eta_0 \sin \omega_0 t)$$

$$|\pm \eta d + \eta_0 \sin \omega_0 t| = |\eta d \pm \eta_0 \sin \omega_0 t|, |E| = (\eta d \pm \eta_0 \sin \omega_0 t)|V|$$

Therefore, the correlation R between $|E|$ and $\eta_0 \sin \omega_0 t$ is obtained by the correlator 30 as follows:

$$R = \lim_{T \to \infty} \frac{1}{2T} \int_{-T}^{T} |E| \cdot \eta_0 \sin \omega_0 t \, dt$$

$$= \lim_{T \to \infty} \frac{V}{2T} \int_{-T}^{T} (\eta d + \eta_0 \sin W_0 t) |V| \sin W_0 t$$

$$= \pm \eta_0 \cdot T_0 \cdot |V|$$

The polarity of this correlation R is the same as the polarity of $\eta d$, and the optimal weighting coefficient can be obtained by increasing or decreasing the weighting coefficient $\eta$ in the direction which is reverse to the polarity of $\eta d$. This is achieved by controlling $\eta$ as to achieve the following relationship, $$d\eta/dt = -\Delta R$$

where $\Delta$ is an infinitesimal coefficient. This means weighting with $$\eta = -\Delta \int R \, dt$$

The integrator 33 accomplishes this integration. A low-pass filter having a sufficiently large time constant can be substituted for the integrator 33. The function of this low-pass filter can also be performed by the low-pass filter 301 of the correlator 30. The polarity of the output of the integrator 33 is inverse to the polarity by the inverter 34 and is fed to the weighting circuit 12, together with a perturbation signal $\eta_0 \sin \omega_0 t$ added. Since the perturbation signal $\eta_0 \sin \omega_0 t$ is small, the weighting is achieved approximately by $\eta = -\Delta \int R \, dt$, which the result that a signal compensated for the error attributable to cross-polarization crosstalk can be obtained as the output of the adder 10. Thus, the cross-polarization interference is eliminated with the optimal weighting coefficient obtained by correction through the establishment of a correlation between the perturbation signal and the error signal resulting from the addition of perturbative oscillation to a weight coefficient. Once cross-polarization interference is eliminated, discriminator 20 accurately identifies the original HR-polarized component H and gives it as its output. The interference eliminating action is performed even more properly. Thus, a correct baseband signal can be restored free of cross-polarization crosstalk.

In this process, the amplitude $\eta_0$ of the infinitesimal output for perturbation, which is supplied from the oscillator 31, remains constant. The perturbation $\eta_0$ continues even after $\eta$ is optimized and cross-polarization interference is completely eliminated, $\eta$ continues fluctuating by $\pm \eta_0$ around its optimal value.

Figure 4:
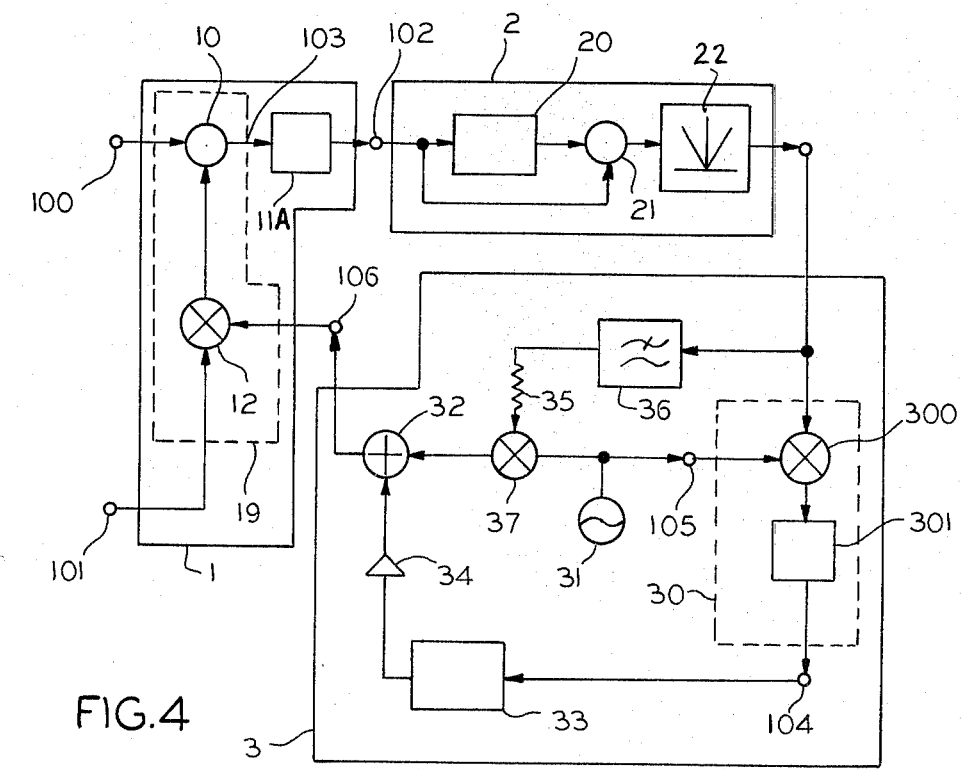

With reference to FIG. 4, a second and improved embodiment has the same structural elements as the first embodiment illustrated in FIG. 3 except for a low-pass filter 36, an attenuator 35, and a multiplier 37. In this second embodiment, the interference cancelling is performed by utilizing the average of the absolute value $|E|$ of each error signal from the error detector 2, to approach zero as the control converges. Thus, as the output of the filter 36 becomes smaller, the weighting operation by the multiplier 37 (serving as an attenuator) is controlled by way of the attenuator 35, to reduce an attenuation coefficient $\beta$. Since it is possible to make a perturbation signal $\beta_0 \sin \omega_0 t$ smaller depending on the progress of the convergence of the control, the relationship of $\eta d \gg \beta \eta_0$ can always be held. In other words, the overall time required to achieve convergence is reduced by giving, at first, a greater perturbation signal for quicker control and then making the control finer with the progress of convergence. Once, cross-polarization interference is eliminated, the discriminator 20 accurately identifies the component H and gives it as its output. The interference eliminating action is performed even more properly. Thus a correct baseband signal, free from cross-polarization interference, can be restored.

Figure 5:
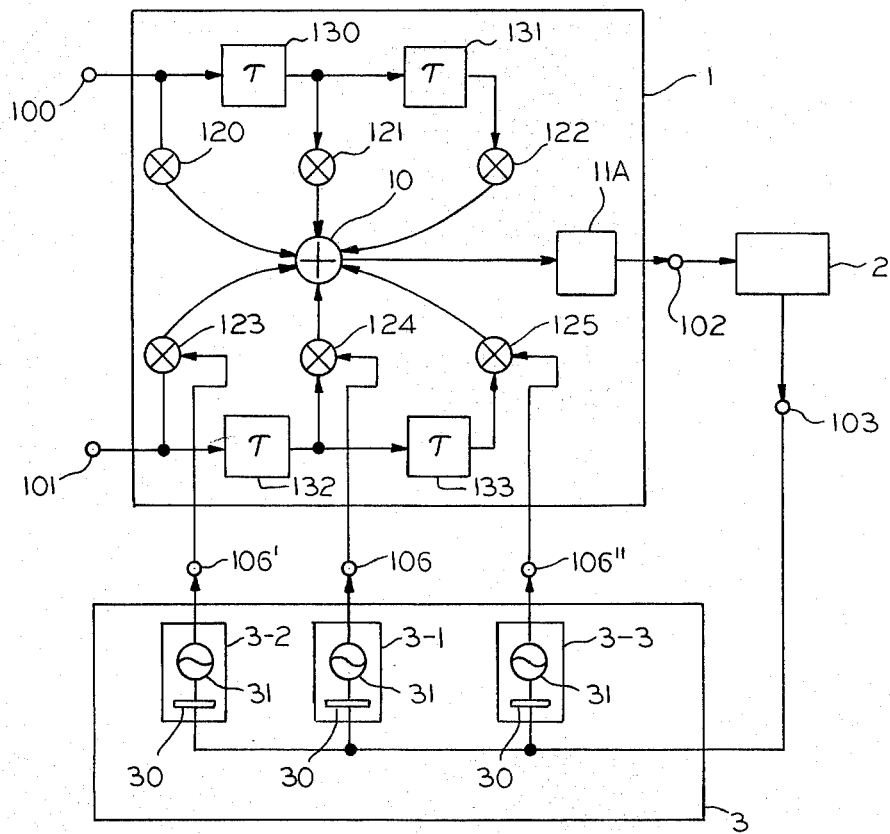

Still other embodiments are illustrated in FIG. 5. In these cases, the so-called transversal equalizer is formed in an orthogonal cross-polarization crosstalk component adder 1. A HR-polarized component is given to an input terminal 100 and through weighting circuits 120, 121, and 122 to an adder 10. These signals are delayed (as indicated by a symbol transmitting cycle $\tau$ by) delay circuits 130 and 131. A VT-polarized component is given to another input terminal 101, as well, where another transversal equalizer is formed by delay circuits 132 and 133 and weighting circuits 123 to 125. Each of the weighting circuits 123 to 125 acquires a coefficient from one of the control means (3-1, 3-2, and 3-3), each of which is composed in the same manner as the control unit 3 of FIG. 3 or 4 referred to above. The adder 10 takes the sum of the outputs of the transversal equalizers and supplies the sum to a detector 11A. In this instance, therefore, cross-polarization interference can be eliminated even if each of the orthogonal cross-polarized components is distorted, in waveform.

The weighting coefficients Cj (j=120, 121, 122) of the weighting circuits 120, 121, and 122 are determined by the zero-forcing method known as a control algorithm and used in conventional automatic equalizers, as represented by the following equation:

$$C_j^{(n+1)} = C_j^{(n)} ad \cdot E_k \cdot H_k - (j-121)$$

where: $\hat{H}_k$ is the output of a discriminator 20, i.e., an estimated value, at a point of time $k\tau$; $E_k$ is the error at the point of time $k\tau$; n is the number of controls effected; and $\alpha$ is a positive adaptation constant (this is a matter of equalization, but not directly related to the present invention).

On the other hand, the control of these weighting circuits is achieved with the control unit 3 having the control means 3-1, 3-2, and 3-3. The oscillating frequencies of three oscillators 31 used in the control means 3-1 to 3-3 are orthogonal to each other, for instance, at $\omega_0$, $2\omega_0$, and $3\omega_0$. Since none of the outputs of comparators 30 of said means 3-1, 3-2, and 3-3 is affected by any perturbation coming from another control means, three independent parameters $C_{123}$, $C_{124}$, and $C_{125}$ can be obtained. The weighting circuits 123, 124, and 125, multiplying the parameters with the VT-polarized component $V_k$, the component $V_k$ delayed by the time $\tau$, and the component $V_k$ delayed by a time $2\tau$, respectively. The products are superimposed on a signal whose HR-polarized component, as mentioned above, is equalized by the adder 10. Therefore, cross-polarization interference can be eliminated.

The circuit 1 shown in FIG. 5, except for its detector means 11A, corresponds to the block 19 in FIGS. 3 and 4. The omission of the channel separator means 90, 91, and 11B of FIG. 2 is also in common to the embodiments illustrated in FIGS. 3 and 4. This embodiment enables the elimination of orthogonal cross-polarization interference appearing with distorted waveforms.

As hitherto described, the present invention enables the elimination of cross-polarization interference without resorting to the arrangement of radio channel frequencies or without using any other signal than the received communication signals. Since the circuit according to the invention is structured to make the perturbation signal smaller corresponding to the average of the absolute values of errors, the present circuit can achieve convergence in a shorter overall period of time.

What is claimed is:

1. A cross-polarization crosstalk elimination circuit for a receiver of two mutually orthogonal cross-polarized waves, said circuit being adapted to restore a baseband signal which is free of cross-polarization interference attributable to orthogonal cross-polarization crosstalk components, said circuit comprising:

orthogonal cross-polarization crosstalk component adder means having a weighting circuit means for multiplying an interference component of the received orthogonal cross-polarized signals by a compensation coefficient, compensating adder means for adding an output of said weighting circuit means to a desired one of the received cross-polarized signals;

detector means for detecting any apparent difference between an estimate of an originally transmitted signal and a desired one of the received signals on a basis of an output of said cross-polarization component adder means;

oscillator means for generating a small cyclic output signal;

correlator means for detecting any correlation between the output of said oscillator means and an output of said detector means;

integrator means for integrating an output of said correlator means;

low-pass filter means responsive to said detector means for smoothing the output of said detector means;

attenuator means for attenuating the output of said oscillator means in response to the output of said low-pass filter means; and control unit adder means for adding an output of said integrator means to an output of said attenuator means and for supplying the resulting sum as the compensation coefficient for said weighting circuit means.

* * * * *